Aug. 20, 1957 D. L. ROWLAND 2,803,293
SPRING ASSEMBLY
Filed Oct. 12, 1953 3 Sheets-Sheet 1
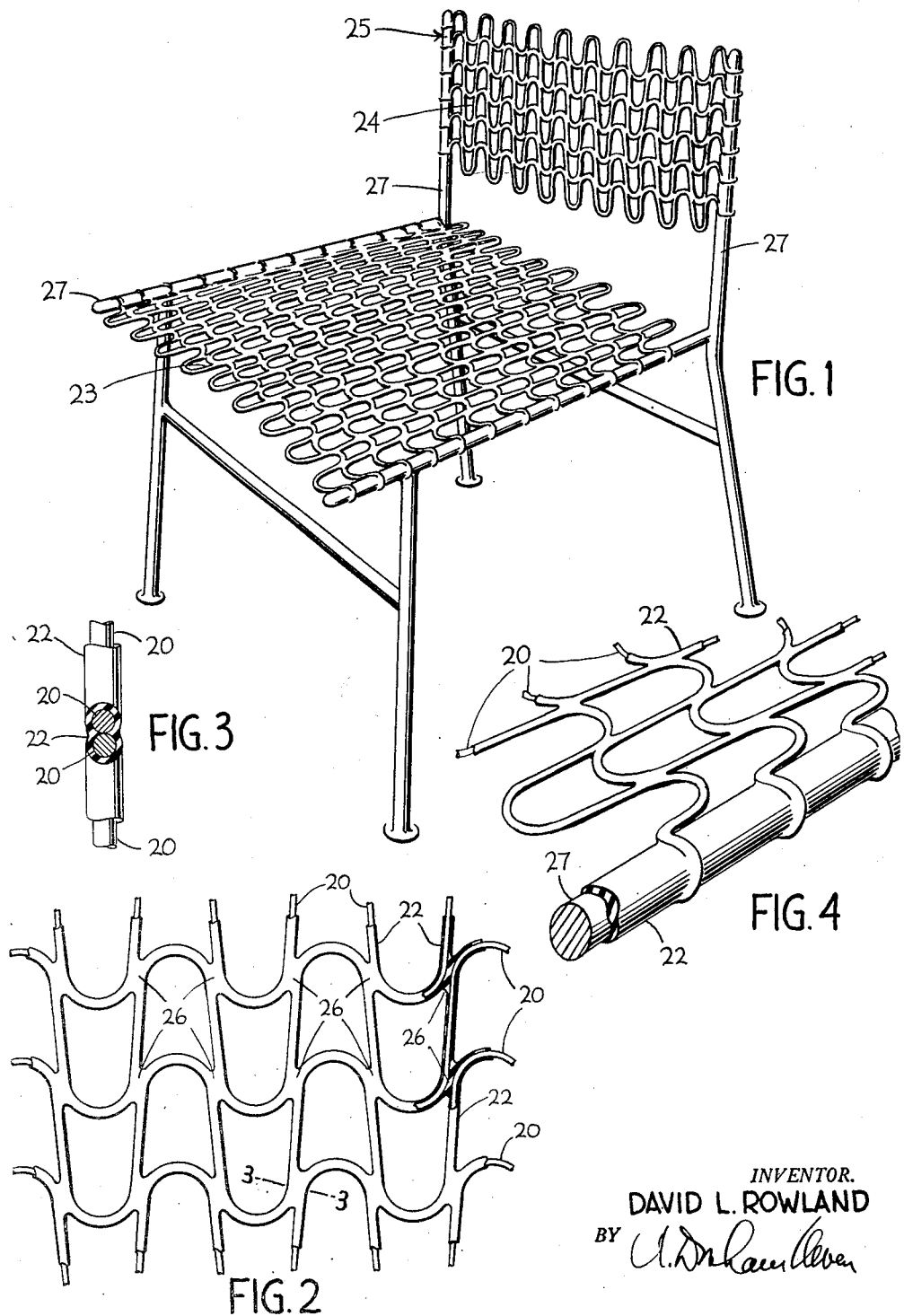
INVENTOR.
DAVID L. ROWLAND Aug. 20, 1957  D. L. ROWLAND  2,803,293
SPRING ASSEMBLY
Filed Oct. 12, 1953  3 Sheets—Sheet 2

INVENTOR.
DAVID L. ROWLAND
BY

Aug. 20, 1957  D. L. ROWLAND  2,803,293
SPRING ASSEMBLY
Filed Oct. 12, 1953  3 Sheets-Sheet 3

INVENTOR.
DAVID L. ROWLAND
BY

United States Patent Office 2,803,293
Patented Aug. 20, 1957

2,803,293
SPRING ASSEMBLY
David L. Rowland, New York, N. Y.
Application October 12, 1953, Serial No. 385,352
3 Claims. (Cl. 155—179)

This invention relates to an improved spring assembly.

The spring assembly of this invention is particularly useful in chair seats and backs and the like, although it has other uses. It solves several problems which prior art spring assemblies had failed to solve. Heretofore, springs were usually attached together by metal clips that passed around two or more springs or by directly hooking together short lengths of spring wire. Hooking the springs together and installing metal clips around metal springs were both tedious operations, resulting in relatively high labor costs. Usually these operations were done by hand, and where similar methods were adapted to machine procedure, assembly was nevertheless complicated expensive and time-consuming.

Once assembled, and sold to the customer, these springs usually had a strong tendency to squeak when sat upon or leaned against, because the metal parts would rub together. There was no way in which this squeak could be averted so long as the prior-art metal-to-metal attachment of springs was used.

Another disadvantage of the prior art structures was that the ends of the hooked portions of the springs and the ends of the metal clips formed sharp edges and therefore could not be used where they would come into direct contact with the clothing, because they would tear the clothing. Therefore, these springs always had to be covered over before they were safe to use, so that spring seats always had to be upholstered.

A further disadvantage of the prior art assemblies was that the metal parts tended to rust, particularly when used out of doors, and rusting caused more squeaking and more likelihood of damaging clothes or upholstery.

The present invention provides a new type of attachment for holding the springs together. At the same time it prevents squeaks, eliminates the sharp edges that caused tearing of fabrics, and protects the metal springs from rust. Basically, my invention comprises a spring assembly in which wires are covered and joined together by a coating of plastic. Preferably, the plastic is applied by dipping the springs either before or after the springs have been assembled together. In either instance, the coating that holds the springs together may also secure them to a border wire, where there is one, to retainer wires, or to frame members, by the same means.

The simplicity of this assembly is an important feature of the invention, and so is the money which is saved. Also, since springs assembled in this way will not squeak and will not tear the clothing, they may be safely sat upon with or without any upholstery fabric. They may be used as either indoor or outdoor furniture and will outlast prior art spring assemblies, because they are protected.

Other objects and advantages of the invention will appear from the following description for several preferred embodiments given in accordance with 35 U. S. C. 112 but without the intention of narrowly limiting the invention to all the structural details described.

In the drawings:

Fig. 1 is a view in perspective of a chair having spring assemblies embodying the principles of this invention and constituting the seat and the back of the chair;

Fig. 2 is an enlarged plan view of a portion of the spring assembly of Fig. 1 with some parts being broken away to show their structure more clearly;

Fig. 3 is an enlarged view in section taken along the line 3—3 of Fig. 2;

Fig. 4 is an enlarged fragmentary view in perspective, showing the attachment of the springs of Fig. 1 to a frame member;

Figure 5:
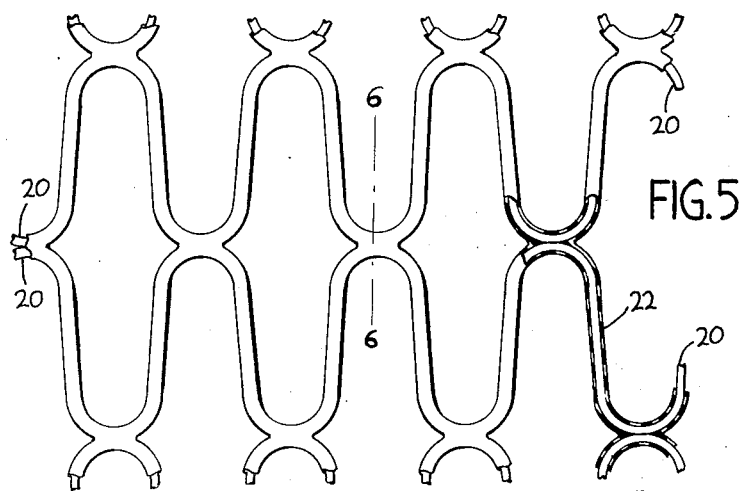
Fig. 5 is an enlarged plan view, similar to Fig. 2, of a modified form of spring assembly made from the same type of individual spring members as those used in Figs. 1 to 4, but put together in a different manner.

Figs. 1 through 9 show spring assemblies made from a number of individual arcuate sinuous springs 20, of the type known as non-sag springs or by the trademark no-sag springs. Heretofore these springs 20 have been assembled together by metal clips 21, such as those used in Fig. 7 (but without the plastic coating shown therein) and the friction of the springs 20 against the clips 21 has caused squeaking, and the other problems already discussed have also plagued this type of assembly. In my invention these clips 21 are not necessary, although they may be used where additional strength is desired or where manufacturers prefer to use this type of assembly.

My invention comprises holding the assembly of springs 20 together by a coating 22 that encircles the springs 20 and encases them. The result is a unitary assembly, such as the seat 23 and back 24 in the chair 25 shown in Fig. 1. As shown in Fig. 3, this coating encircles any two wires 20 when they meet or come very close together, forming the linkages 26. Similarly, the plastic coating 22 joins the wires 20 securely to the frame 27, as shown in Fig. 4. The plastic 22 used may be vinyl chloride acetate, vinyl chloride, polyethylene, butadiene, or any other similar rubbery materials which may be evolved in the future. In assembly the arcuate sinuous springs 20 may be slipped on the frame 27 or may be placed over it and individually wound around it. The resultant unit 23, 24 is then dipped in the rubber or plastic latex, that is thick enough to make the needed juncture, and the latex is then cured. The coating material should be of strong enough consistency to hold the springs 20 together where they touch, as at 26, or where they come near enough together to be united by the plastic layer 22, and also to the frame 27.

The chair 25 illustrates that this invention makes it possible to use the plastic coated and plastic joined arcuate sinuous springs in generally parallel formation to constitute a complete chair seat 23 or chair back 24 on which no upholstery need be used, thereby giving a light, airy appearance. The plastic encasement 22 not only holds the springs 20 together and holds them to the frame 27; it also is weather resistant, so that the spring assemblies 23, 24 may be used out of doors, they protect clothing and upholstery fabrics from being torn by metal edges, and they present an insulating surface that does not have the objectionable feel of bare metal.

In Figs. 1 to 4 the springs are assembled in a generally parallel fashion. In Figs. 5–9 they are assembled in opposition rather than in parallel. Otherwise the principles of the invention are the same. The plastic 22 may extend in between (as well as around) two spring wires 20 where the wires come very near to each other but do not quite touch or the wires 20 may actually touch.

Figure 6:
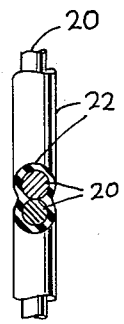
Fig. 6 is a view in section taken along the line 6—6 of Fig. 5.
Figure 7:
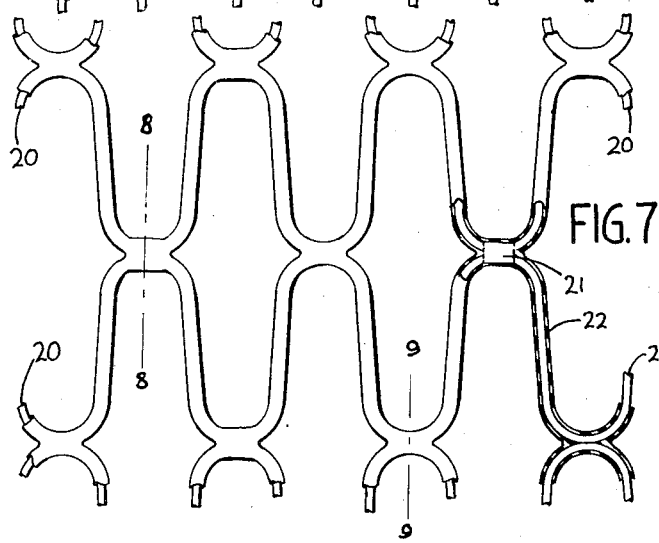
Fig. 7 is a plan view, similar to Fig. 5, of another modified form of the invention using the same type of springs and assembly pattern as in Fig. 5, but in which a metal clip is also used.
Figures 8, 9:
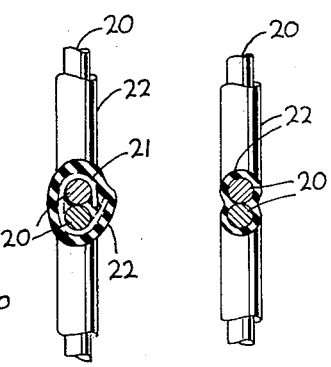
Fig. 8 is a view in section taken along the line 8—8 in Fig. 7.
Fig. 9 is a view in section taken along the line 9—9 in Fig. 7.

In Fig. 7 where the clips 21 are also used, the plastic coating around the springs 20 protects fabric from tearing and also ties the springs 20 together tightly to prevent the squeaking caused by metal moving against metal. Normally these clips 21 are used on only every other loop, but, as Fig. 6 shows, the springs 20 are attached by the plastic 22 at every loop, whether there is a metal clip 21 there or not. The seal at every loop, the enclosure of the wires and clips, and the prevention of squeaks are novel effects of this invention.

Figure 10:
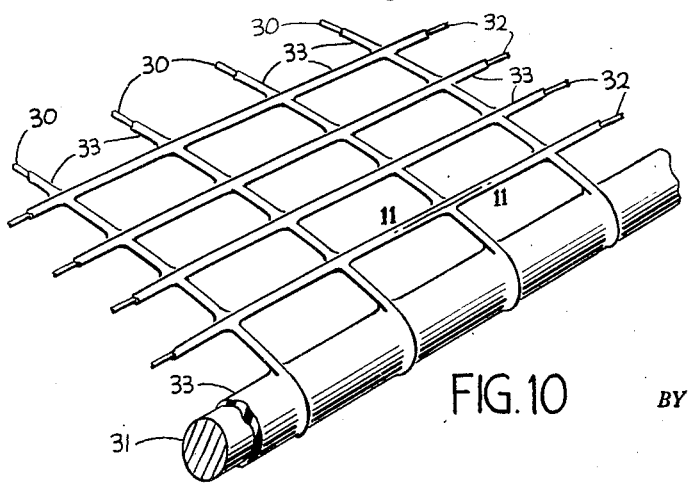
Fig. 10 is a view in perspective of another modified form of the invention in which straight spring wires are employed instead of sinuous ones.
Figure 11:
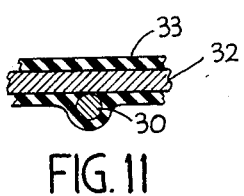
Fig. 11 is an enlarged view in section taken along the line 11—11 in Fig. 10.
Figure 12:
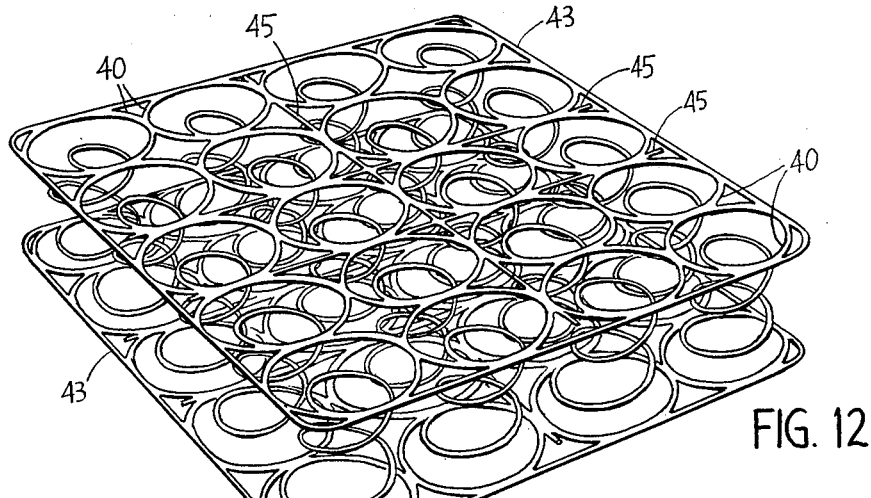
Fig. 12 is a view in perspective of a spring assembly employing coil springs in a box type of assembly, the springs being attached together and to the border wire according to the principles of the present invention.
Figure 13:
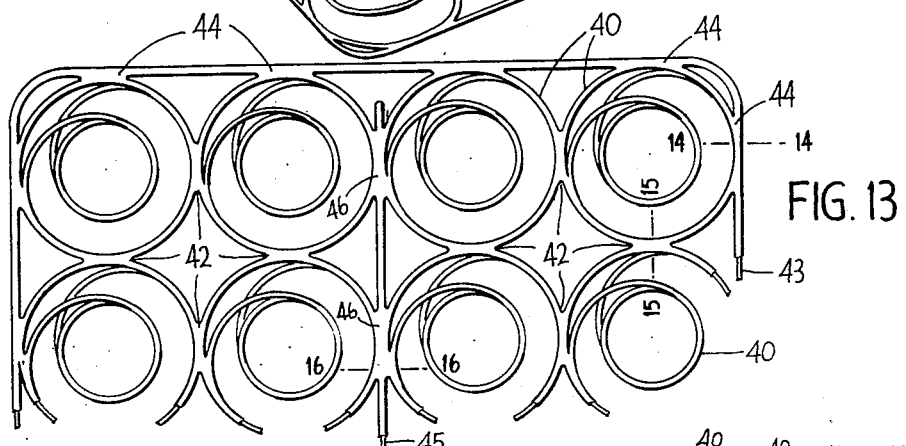
Fig. 13 is a plan view of a portion of the spring assembly of Fig. 12, with some portions broken away to show the structure.
Figures 14, 15, 16:
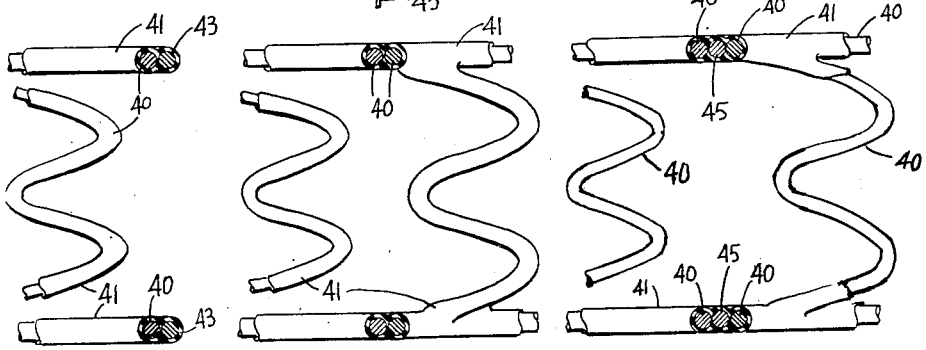
Fig. 14 is a view in section taken along the line 14—14 in Fig. 13.
Fig. 15 is a view in section taken along the line 15—15 in Fig. 13.
Fig. 16 is a view in section taken along the line 16—16 in Fig. 13, but illustrating a modification in which only the top and bottom portions of the coil spring unit are coated and not the vertical wires.

A similar adaptation of the principles of this invention may be made for assemblies constructed from straight spring wires 30, as shown in Figs. 10 and 11. Here some straight spring wires 30 are attached to the frame 31 by simply being hooked around it, other spring wires 32 are placed over or under the wires 30 and generaly perpendicular to them. The whole assembly is then dipped to coat all the wires 30, 32 and the frame 30 in a plastic, rubber or other type of suitable material, and this coating 33 binds the springs together where they cross and also holds the springs to the frame member 31.

Figs. 12 through 15 show how the invention may be used with coil springs in a box type assembly. Preferably, the coils 40 are held together mechanically so that they touch as with special jigs (not shown) and then the whole assembly is coated. The coating 41 secures the coil springs to each other by a linking covering 42 at their upper and lower levels. In the same way, and at the same time they may also be secured to the border wire 43 at 44 and retaining wires 45 at 46. When the coating is cured and solidifies, the mechanical means may be removed or they may be left in place as they were in the structure of Figs. 7 to 9.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A spring assembly comprising rigid frame members, a series of arcuate sinuous spring wires looped at their ends around said frame members and extending between them, each wire touching its adjacent wires at least once per cycle, and a thin, cylindrical, sleeve-like plastic coating surrounding said wires and following their sinuous shape and also surrounding said frame and linking said wires and frame together into a unitary assembly.

2. The assembly of claim 1 in which said wires extend generally parallel to each other, with the outside of one loop nesting against the inside of the loop of the adjacent wire.

3. The assembly of claim 1 in which said wires extend alternately in opposite directions with the outside maxima of adjacent loops tangent.

References Cited in the file of this patent

UNITED STATES PATENTS

| | | |
|---|---|---|
| 1,423,065 | Arnold | July 18, 1922 |
| 1,718,386 | Sherwood | June 25, 1929 |
| 2,247,543 | Bernstein | July 1, 1941 |
| 2,276,516 | Roy | Mar. 17, 1942 |
| 2,415,765 | Schmidt | Feb. 11, 1947 |
| 2,459,758 | Flint | Jan. 18, 1949 |

FOREIGN PATENTS

| | | |
|---|---|---|
| 991,792 | France | June 27, 1951 |